United States Patent [19]
Nicholson

[11] Patent Number: 6,113,326
[45] Date of Patent: Sep. 5, 2000

[54] SYSTEM AND DEVICE FOR LOADING AND TRANSPORTING VEHICLES

[75] Inventor: George E. Nicholson, P.O. Box 116, Burlington, Wyo. 82411

[73] Assignee: George E. Nicholson, Burlington, Wyo.

[21] Appl. No.: 08/777,759

[22] Filed: Dec. 30, 1996

[51] Int. Cl.[7] .................................................... B60P 7/08
[52] U.S. Cl. ................................ 410/30; 410/3; 410/7; 410/19; 410/49
[58] Field of Search .................... 410/3, 4, 8, 9, 410/16, 19, 30, 44, 49, 50; 188/32, 4 R; 248/499, 500, 503, 351

[56] References Cited

U.S. PATENT DOCUMENTS

| | | | |
|---|---|---|---|
| 1,768,265 | 6/1930 | Nicholls | 188/32 |
| 1,776,935 | 9/1930 | Snyder | 410/30 |
| 1,949,218 | 2/1934 | Owens . | |
| 2,114,081 | 1/1938 | Porte . | |
| 2,114,707 | 4/1938 | Fitch et al. . | |
| 2,697,494 | 12/1954 | Parks | 188/32 |
| 2,757,039 | 7/1956 | Merriman . | |
| 2,906,212 | 9/1959 | Hayes | 410/3 X |
| 3,595,344 | 7/1971 | Woestenburg . | |
| 3,829,148 | 8/1974 | Stoneburner | 410/49 |
| 4,024,820 | 5/1977 | Hlinsky et al. . | |
| 4,044,692 | 8/1977 | Cruthis et al. . | |
| 4,102,274 | 7/1978 | Feary et al. | 410/50 |
| 4,106,735 | 8/1978 | Partain et al. | 410/49 |
| 4,307,985 | 12/1981 | Desprez et al. | 410/46 |
| 4,399,893 | 8/1983 | Switzer | 188/32 |
| 4,711,325 | 12/1987 | Mountz | 188/32 |
| 4,792,268 | 12/1988 | Smith | 410/9 |
| 4,836,337 | 6/1989 | Borrelli . | |
| 5,137,405 | 8/1992 | Klein | 410/94 |

FOREIGN PATENT DOCUMENTS

1710417-A1  2/1992  U.S.S.R. ................................ 410/30

*Primary Examiner*—Stephen T. Gordon
*Attorney, Agent, or Firm*—Workman, Nydegger & Seeley

[57] ABSTRACT

A system and device for loading and transporting a vehicle on a vehicle transporting surface simplifies the loading of vehicles by aligning the vehicle as it is loaded and holds the vehicle securely in alignment once loaded. The vehicle loading device is formed with an angulated surface that is attached to the side of the vehicle transporting surface. A flat plate attaches to the angulated surface and a brace extends downward from the far edge of the flat plate and rests against the side of the vehicle transporting surface. The vehicle is loaded onto the vehicle transporting surface with the angulated surface pressing against the interior of tracks or wheels of the vehicle. The angulated surface forces an initially misaligned vehicle to slide into proper alignment on the vehicle transporting surface. Opposing forces are thus exerted on the inside of the tracks and wheels which cause and maintain proper alignment. A system including a plurality of vehicle loading devices is used to maintain proper alignment of the vehicle while driving the vehicle onto both a ramp and a vehicle transporting surface, and to prevent misalignment of the vehicle while the vehicle loading surface is in motion during transportation of the vehicle.

18 Claims, 4 Drawing Sheets

SYSTEM AND DEVICE FOR LOADING AND TRANSPORTING VEHICLES

BACKGROUND OF THE INVENTION

1. The Field of the Invention

The present invention is directed to devices for loading a vehicle onto a vehicle transporting surface such as a flatbed trailer deck and for securing the vehicle to the vehicle transporting surface. More particularly, the present invention is directed to devices for properly aligning a vehicle as the vehicle is being loaded onto a vehicle transporting surface and for securing the vehicle to the vehicle transporting surface once loaded, such that the vehicle does not become misaligned on the vehicle transporting surface when transporting the vehicle. The present invention is particularly useful for loading a track driven vehicle, such as bulldozer, onto a raised deck, such as a flatbed trailer, and for securing the track driven vehicle to the raised deck during transportation of the track driven vehicle.

2. The Relevant Technology

The operation of construction machinery is generally a dangerous undertaking. One of the most dangerous aspects of operating a construction machine is loading the construction machine onto a vehicle transporting surface such as a deck of a tractor/trailer rig, a rail road car, a barge, a ship deck, etc. As an example, construction machines such as a bull dozer, excavator, or the like must often be loaded onto a vehicle transporting surface such as the deck of a flatbed trailer as is commonly towed by a large diesel truck. The construction machine is typically driven up a loading ramp and onto the deck of the flatbed trailer. In so doing, the tracks of the construction machine can easily slip on the loading ramp so as to misalign the construction machine. It is also difficult to initially align the construction machine with the proper orientation to the deck, especially when the ground beneath the deck is not level. Thus, properly aligning the construction machine to the deck of the flatbed trailer as it is being loaded is a difficult task.

Another danger is that while driving the construction machine up the loading ramp, the loading ramp and deck of the flatbed trailer are often largely obscured from the operator's view by the front of the construction machine. Furthermore, often the construction machine is so wide that the tracks or wheels hang over the edges of the flatbed trailer. In such a case, little leeway for misalignment of the construction machine is available. In such situations, if the construction machine is not properly aligned as it starts up the loading ramp, or if it becomes misaligned as it progresses up the loading ramp, the construction machine can tip off the side of the flatbed trailer. The collision that results can seriously injure or even kill the construction machine operator and can also seriously damage the construction machine.

The difficulty in loading construction machines is further aggravated by the fact that once the construction machine is put in motion up the loading ramp, it becomes dangerous to stop or realign the construction machine until it reaches the flatbed trailer deck beyond the loading ramp.

Once the construction machine is loaded onto the flatbed trailer, conventional methods of securing the construction machine to the flatbed trailer are also inadequate. Typically, chains are used to secure the construction machine to the flatbed trailer deck. These chains are typically about ⅜ inch gauge, and have a tensile strength of about 6600 pounds. Yet, these chains are often required to secure a 20 or 30 ton construction machine.

Typically, the chains are tightened with a hand lever, which provides an initial degree of tightness. Nevertheless, once the truck and flatbed trailer are moving down a highway, the chains quickly loosen. The chains may have to be tightened frequently, particularly when the tracks of the construction machine are packed with dirt. Securing and tightening the chains is time consuming. If the chains are not kept tight, the construction machine can easily become misaligned on the flatbed trailer. Heavy braking such as when the truck and flatbed trailer come to an unexpected stop or turn suddenly can put the construction machine into a dangerous misaligned position.

Once a misalignment occurs, the chains are easily snapped by the momentum of the construction machine. As such, the construction machine can fall off the flatbed trailer and roll to the ground and down the road at high speed.

A need exists for an improved device for loading a construction machine or other vehicle on a vehicle transporting surface and for securing the vehicle to the vehicle transporting surface once loaded.

SUMMARY OF THE INVENTION

The present invention seeks to resolve the above and other problems which have been experienced in the art. More particularly, the present invention constitutes an advancement in the art by providing a system, method, and device for loading and transporting a vehicle on a vehicle transporting surface.

The vehicle loading system comprises a vehicle transporting surface such as the deck of a flatbed trailer on which the vehicle can be situated and on which the vehicle can be transported. Also provided are a first and a second vehicle loading device, each of which are situated on an opposite side of the vehicle transporting surface. Each of the first and the second vehicle loading devices are configured with a flat plate that is suitable for resting flush on the vehicle transporting surface. Attached to one edge of the flat plate is a bracing member extending downward from the flat plate to anchor the flat plate to the side of the vehicle transporting surface.

At an opposing edge of the flat plate is attached an angulated surface that extends upward from the flat plate at an angle from the flat plate other than orthogonal to the flat plate. Also provided is an upwardly protruding and laterally extending member situated cross-wise on the flat plate for preventing forward and rearward motion of the vehicle.

In operation, several pairs of the vehicle loading devices are typically used and are arranged on the vehicle transporting device. The vehicle loading devices are strategically located such that when the tracks or wheels of the vehicle transporting device is loaded onto the vehicle transporting surface, an angulated surface engages the interior of a wheel or track on either side of the vehicle. Thus, the first and the second aligning device each exert an opposing force on the vehicle that causes a misaligned track or wheels to slide down the angulated surface and become aligned in a selected orientation on the vehicle transporting surface.

In an alternate embodiment, a lip extends laterally from the brace towards the angulated surface to engage with an edge of the vehicle transporting surface. Also, a rubber mat can be located between the vehicle loading device and the vehicle transporting surface to prevent slippage of the vehicle loading device on the vehicle transporting surface.

In a further embodiment, a flat bar is attached between the angulated surfaces of a pair of vehicle loading devices. Two pairs of thusly configured vehicle loading devices are then located on the vehicle loading surface, one at either side, and are used to load and maintain alignment of a wheeled vehicle.

In a further alternate embodiment, a system is provided in which a vehicle loading device is formed with an angulated surface and a tongue protruding downward from the angulated surface. The tongue is configured to engage with a receiver slot located in the vehicle transporting surface. The vehicle loading device is thus removable. Several of such systems can be used to load and secure a vehicle on a vehicle transporting surface.

In still another alternate embodiment, a vehicle loading device is provided that is adjustable. Two flat plates are provided, each having slots or holes. One flat plate is connected with the angulated surface and a second flat plate is connected with a brace that engages the edge of the vehicle loading surface. The two flat plates are connected together with the use of bolts fastened through the slots or holes of each of the flat plates. Consequently, by altering the position of the bolts in the slots or inserting the bolts through separate holes, the distance between the angulated surface and the brace can be altered. In this manner, vehicles of differing sizes can be accommodated.

The vehicle loading device can also be made adjustable by attaching shims to the inside of the bracing member. Adding shims would allow for use with a vehicle that has a wider distance between the tracks or wheels, and deleting shims would allow for use with a vehicle that has a narrower distance between the tracks or wheels.

Another alternate embodiment comprises the use of a multiangled surface to engage with the wheels or tracks of a vehicle. A steep or orthogonal angle connected at the top or bottom of the angulated surface prohibits the wheels or tracks once aligned from being jolted out of the vehicle loading device. A pin can also be inserted through the angulated surface over a bottom portion of a track to further retain the track on the vehicle loading device.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
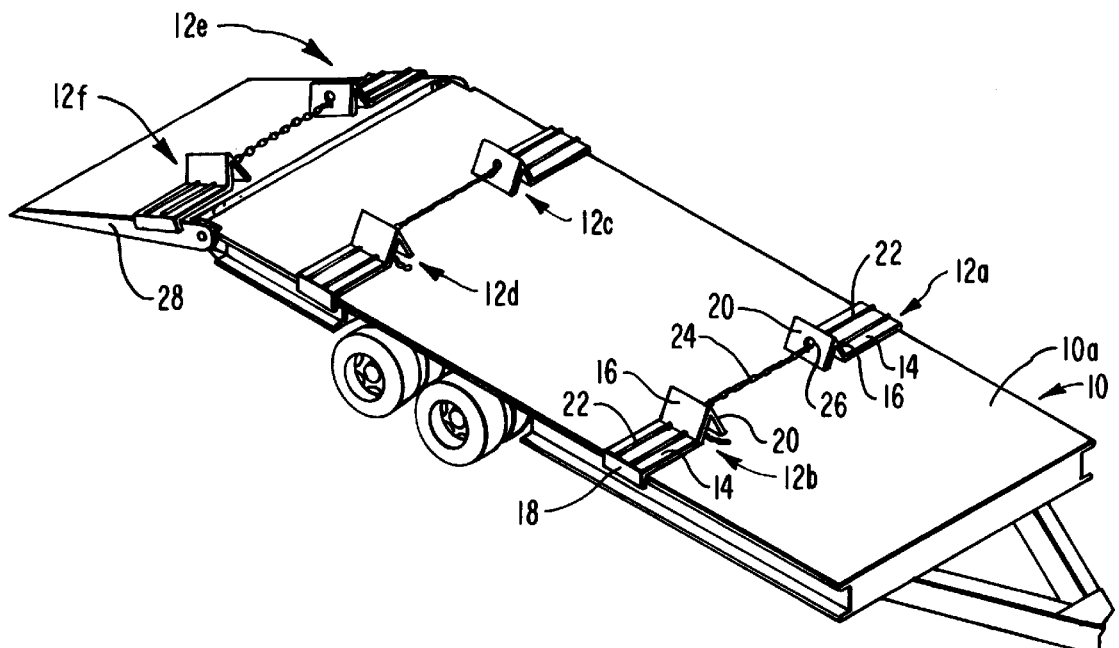
FIG. 1 is a perspective view of a flatbed trailer having thereon a plurality of vehicle loading devices of the present invention.

A basic embodiment of a system of the present invention for loading a vehicle onto a vehicle transporting surface is shown in FIG. 1. Shown in FIG. 1 is a flatbed trailer 10 having thereon a vehicle transporting surface in the form of a deck 10a on which a vehicle can be transported. Situated on flatbed trailer 10 are a plurality of vehicle loading devices 12a–12f.

As shown for the pair of vehicle loading devices 12a and 12b, each of vehicle loading devices 12a–12f of the depicted embodiment are comprised of a flat plate 14 which rests flush on deck 10a. Extending upward from flat plate 14 is an angulated surface 16 that is integrally connected to flat plate 14. Angulated surface 16 and flat plate 14 form a nonorthogonal angle therebetween. Thus, when flat plate 14 rests on deck 10, as shown, angulated surface 16 is set at an angle other than orthogonal to deck 10a. Preferably, the nonorthogonal angle is in a range from about 30 to about 80 degrees. More preferably, the nonorthogonal angle is about 45 degrees.

Located at an opposite edge of flat plate 14 from angulated surface 16 is a bracing member 18 extending downward from flat plate 14. Bracing member 18 together with flat plate 14 serve as a means for engaging angulated surface 16 with deck 10a. Thus, flat plate 14 is situated such that bracing member 18 rests against an outer edge of deck 10a with angulated surface 16 resting on deck 10a. Other means for engaging angulated surface 16 with vehicle transporting surfaces such as deck 10a will be described below in alternate embodiments.

A support member 20 is attached to angulated surface 16 and serves to support angulated surface 16 when large forces are exerted on angulated surface 16. In the depicted embodiment, support member 20 is also set at an angle to deck 10a, but support member 20 could also be orthogonal to deck 10a.

A pair of laterally extending bars 22 are located on flat plate 14 and serve as a means for preventing forward and rearward motion of a vehicle being transported with the use of vehicle loading devices 12a–12f. Laterally extending bars 22 extend orthogonally outward from angulated surface 16 so as to engage cleats of tracked vehicles loaded on flatbed trailer 10 and to prohibit the cleats from sliding to the front or rear of flatbed trailer 10. Any number of laterally extending bars 22 can be used, and of course, vehicle loading devices 12a–12f could be used without laterally extending bars 22.

In the depicted embodiment, flat plate 14 is about 8 inches wide and about 18 inches long. Flat plate 14 can be of other dimensions, but is preferably sufficiently wide that it is not displaced when tracks or wheels of a vehicle are loaded thereon. Bracing member 18 in the depicted embodiment is about 4 inches long. In the depicted embodiment, each of bracing member 18, flat plate 14, and angulated surface 16 are formed of ¾ inch thick steel plating and are welded together in the depicted configuration.

In the vehicle loading system of FIG. 1, three pairs of vehicle loading devices 12a–12f are situated on flatbed trailer 10. A first pair of vehicle loading devices 12a and 12b are situated towards the front of flatbed trailer 10. A second pair of vehicle loading devices 12c and 12d are situated toward the rear of flatbed trailer 10. A third pair 12e and 12f are situated at the top of loading ramp 28.

Each pair of vehicle loading devices 12a–12f are connected by a chain 24 as seen for first pair of vehicle loading devices 12a and 12b. Chains 24 adjustably attach with a key hole 26 formed in each support member 20 of vehicle loading devices 12a–12f. Chains 24 keep vehicle loading devices 12a–12f properly aligned during loading of bulldozer 30 and when flatbed trailer 10 travels without a vehicle loaded thereon. Vehicle loading devices 12a–12f could also be used without chains 24, and chains 24 could be replaced with cables or other suitable fastening devices. Chains 24 or any other securing devices that are used could also be attached to vehicle loading devices 12a–12f with other attaching means. For instance, chains 24 could also be welded or bolted to vehicle loading devices 12a–12f.

Figure 2:
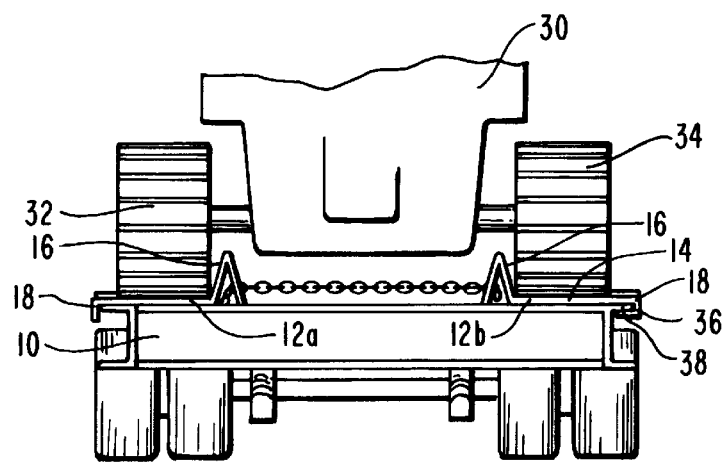
FIG. 2 is a front view of a flatbed trailer having thereon a plurality of vehicle loading devices of the present invention maintaining proper alignment of a bulldozer on a deck of the flatbed trailer during transportation of the bulldozer on the flatbed trailer.

FIG. 2 shows a vehicle in the form of a bulldozer 30 loaded onto flatbed trailer 10 and secured in place by vehicle loading devices 12a and 12b. Vehicle loading devices 12c and 12d also secure the rear of bulldozer 30, although not seen in FIG. 2. As can be seen from FIG. 2, flat plates 14 each have a selected length that causes the bottom of angulated surfaces 16 to align with the inside edge of one of a right track 32 and a left track 34. Thus, an opposing aligning force holds right and left tracks 32 and 34 from sliding over angulated surfaces 16. The force of gravity also holds braces 18 against the edges of deck 10a. Accordingly, due to the strategic placement of angulated surfaces 16, bulldozer 30 is held in proper alignment on flatbed trailer 10 by its own weight and is secured against movement in a lateral direction. Additionally, laterally extending bars 22 of FIG. 1 engage with cleats on right and left tracks 32 and 34 and keep bulldozer 30 from sliding frontward or rearward. Bulldozer 30 can thereby be transported without being displaced or otherwise misaligned.

Figure 3:
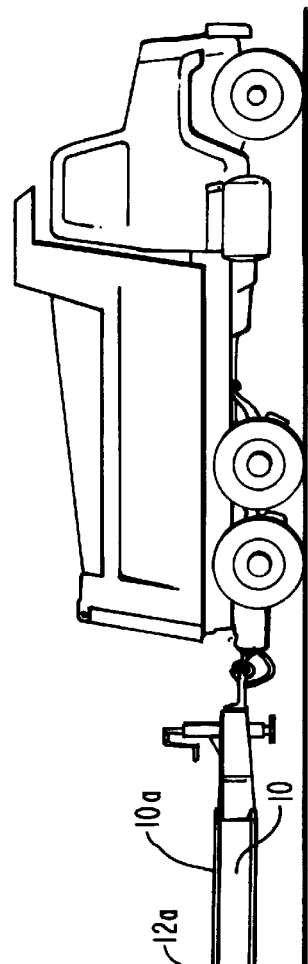
FIG. 3 is a side view of a system for loading a vehicle on a vehicle transporting surface and comprises a diesel truck, a flatbed trailer supplied with a plurality of vehicle loading devices of the present invention, and a bulldozer being loaded onto the flatbed trailer with the use of the vehicle loading devices.

FIGS. 3 through 6 show a method of using vehicle loading devices 12a–12f to load a bulldozer 30 onto flatbed trailer 10. Shown in FIG. 3 is a bulldozer 30 progressing up loading ramp 28 of flatbed trailer 10. As shown therein, the operator's line of sight 40 is blocked such that deck 10a cannot be seen by the operator. Furthermore, bulldozer 30 is tilted, and must pivot down onto deck 10a. Immediately prior to such pivoting, a minimum of right and left tracks 32 and 34 are in contact with deck 10a or ramp 28, such that bulldozer 30 can be easily misaligned. Excessive slippage of right and left tracks 32 and 34 at this point can result in bulldozer 30 falling off of flatbed trailer 10.

Figure 4:
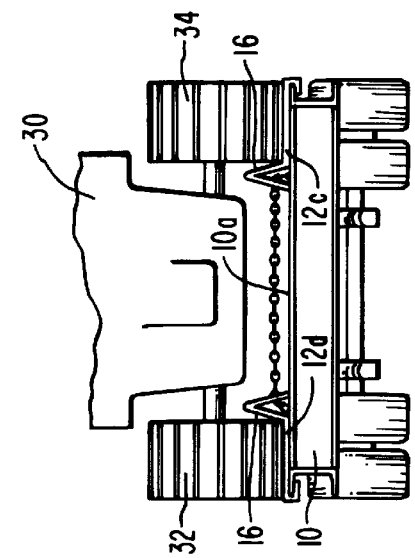
FIG. 4 is a front view of the flatbed trailer and bulldozer of FIG. 3 showing the bulldozer of FIG. 3 misaligned on the flatbed trailer.

FIG. 4 is a frontal view of flatbed trailer 10 showing the possible result of loading bulldozer 30 without the use of vehicle loading devices 12a–12f of the present invention. As can be seen, left track 34 is hanging off the edge of deck 10a. This misalignment causes an uneven load, which is dangerous and even illegal. Furthermore, if the misalignment becomes too severe, as discussed, bulldozer 30 can tip completely off the side of deck 10a. In order to realign bulldozer 30 on deck 10a, bulldozer 30 must be driven off flatbed trailer 10 and reloaded. Doing so can be extremely dangerous as further misalignment can occur during unloading.

When using the vehicle loading devices of the present invention as shown in FIG. 3, three pairs of vehicle loading devices 12a–12f are preferably situated on flatbed trailer 10 and are arranged in the manner described in the discussion of FIG. 1. Vehicle loading devices 12a–12f also serve as a visual guide for proper initial alignment as bulldozer 30 is being driven onto flatbed trailer 10.

As bulldozer 30 reaches the top of loading ramp 28, right and left tracks 32 and 34 each contact one of angulated surfaces 14 of vehicle loading devices 12e and 12f. Any existing misalignment is subsequently remedied by the force of gravity which causes right track 32 which is the more interior of right and left tracks 32 and 34 to slide down angulated surface 14 of vehicle loading device 12e until it rests squarely on flat plate 14. The force of gravity also prevents left track 34 from sliding up angulated surface 14 of vehicle loading device 12f. Thus, angulated surfaces 12a–12f serve as a means for aligning bulldozer 30 in a selected orientation on deck 10a.

Figure 5:
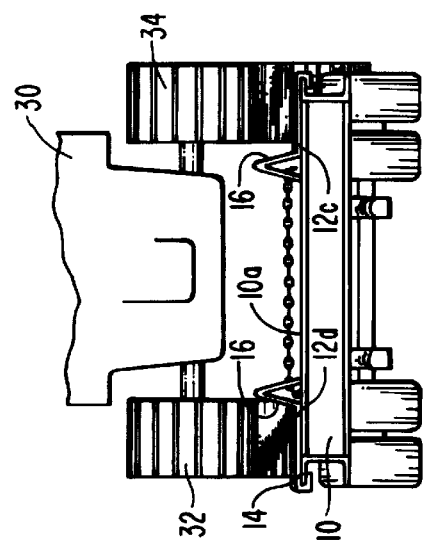
FIG. 5 is a front view of the bulldozer and flatbed trailer of FIG. 4 showing the position of the bulldozer as it is loaded onto the flatbed trailer just subsequent to the position shown in FIG. 3, and showing a misalignment of the bulldozer on the flatbed trailer prior to an alignment using the vehicle loading devices of the present invention.
Figure 6:
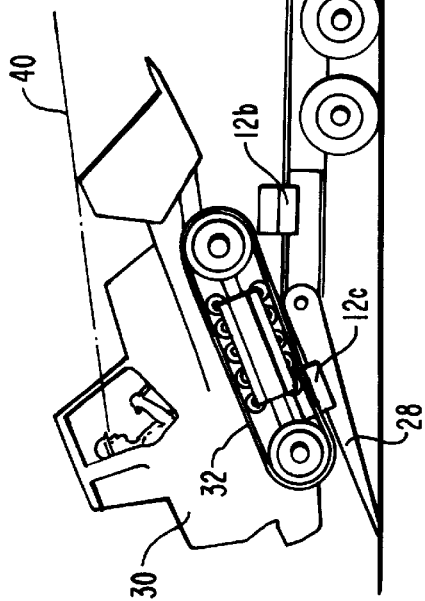
FIG. 6 is a front view of the bulldozer and flatbed trailer of FIG. 5 showing the bulldozer being aligned with the vehicle loading devices of FIG. 5.

FIGS. 5 and 6 show the operation of vehicle loading devices 12a–12f in aligning bulldozer 30. FIG. 5 is a frontal view taken just subsequent to the view of FIG. 3. As shown therein, bulldozer 30 has become misaligned while pivoting onto deck 10a. It is preferred that angulated surfaces 16 be sufficiently high that, as shown in FIG. 3, right and left tracks 32 and 34 are always in contact with either angulated surfaces 16 of vehicle loading devices 12e and 12f or vehicle loading devices 12c and 12d. Thus, such a misalignment would typically be prevented or at least would be relatively slight. Nevertheless, for the purpose of illustration of the functionality of vehicle loading devices 12a–12f, an exaggerated misalignment is shown to occur as bulldozer 30 pivots onto deck 10a.

As bulldozer 30 pivots onto deck 10a, right track 32 contacts the top of angulated surface 16 of vehicle loading device 12d which causes right track 32 to slide down onto flat plate 14. Concurrently, angulated surface 16 of vehicle loading device 12c keeps left track 34 in proper position, thereby aligning bulldozer 30 to the center of deck 10a.

Bulldozer 30 is then driven the rest of the way onto flatbed trailer 10. Right and left tracks 32 and 34 thereby are put into contact with two sets of vehicle loading devices 12a and 12b and 12c and 12d as discussed for FIG. 2. Bulldozer 30 can thereafter be transported without the need for chaining as in the prior art. Furthermore, bulldozer 30 is retained more securely on flatbed trailer 10 than it would be with only chains holding it in alignment.

Alternate embodiments of the means for engaging the aligning means with the vehicle transporting surface are shown in FIG. 2. As seen therein, vehicle loading device 12a comprises a downward extending bracing member 18 which rests against the side of deck 10a to hold angulated surface 14 in place. Vehicle loading device 12b differs slightly in that it further comprises a laterally extending lip 36 extending from bracing member 18 back toward angulated surface 16 and wrapping around an edge 38 of deck 10a.

Figure 7:
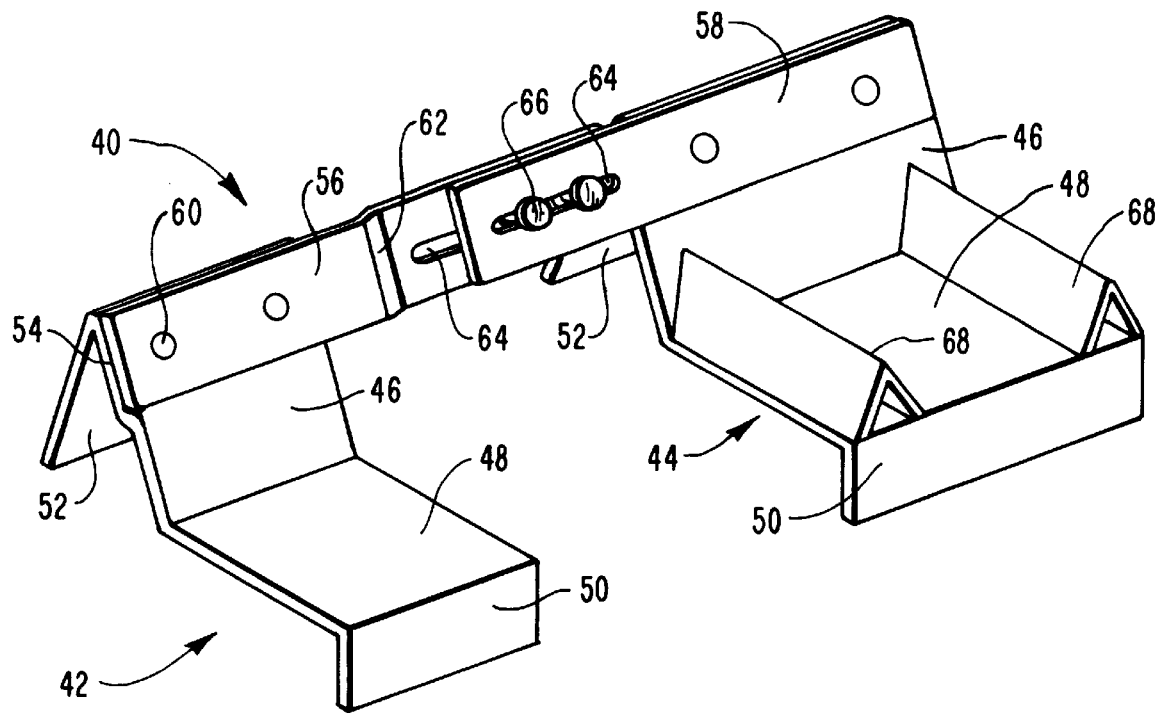
FIG. 7 is a perspective view of a device for loading wheeled vehicles.

Further alternate embodiments are depicted in FIGS. 7 through 10. FIG. 7 shows a wheeled vehicle retaining system 40 with a pair of vehicle loading devices 42 and 44 adapted specifically for loading and securing wheeled vehicles. As shown therein, each of vehicle loading devices 42 and 44 comprises an angulated surface 46, a flat plate 48 connected between angulated surface 46 and a brace 50, and a support member 52. In addition, angulated surfaces 46 are each configured with a slot 64 for receiving one of a pair of flat bars 56 and 58. Flat bars 56 and 58 are bolted to vehicle loading devices 42 and 44 through recesses 60. A bend 62 in flat bar 56 allows flat bars 56 and 58 to adjustably interface. Slots 64 receive bolts 66 to adjustably secure flat bar 56 to flat bar 58. Of course, flat bars 56 and 58 could be replaced with a single flat bar, or with bars of other shapes.

A pair of triangulated retaining bars 68 allow the operator to know where the wheels of the wheeled vehicle are located with respect to vehicle loading devices 42 and 44. Triangulated retaining bars 68 also help to prevent forward and rearward motion of the wheeled vehicle. Flat bars 56 and 58 prevent misaligning movement of the wheeled vehicle during transportation, and also serve to align the wheeled vehicle as it is driven onto the vehicle transporting surface essentially in the same manner as described above.

Figure 8:
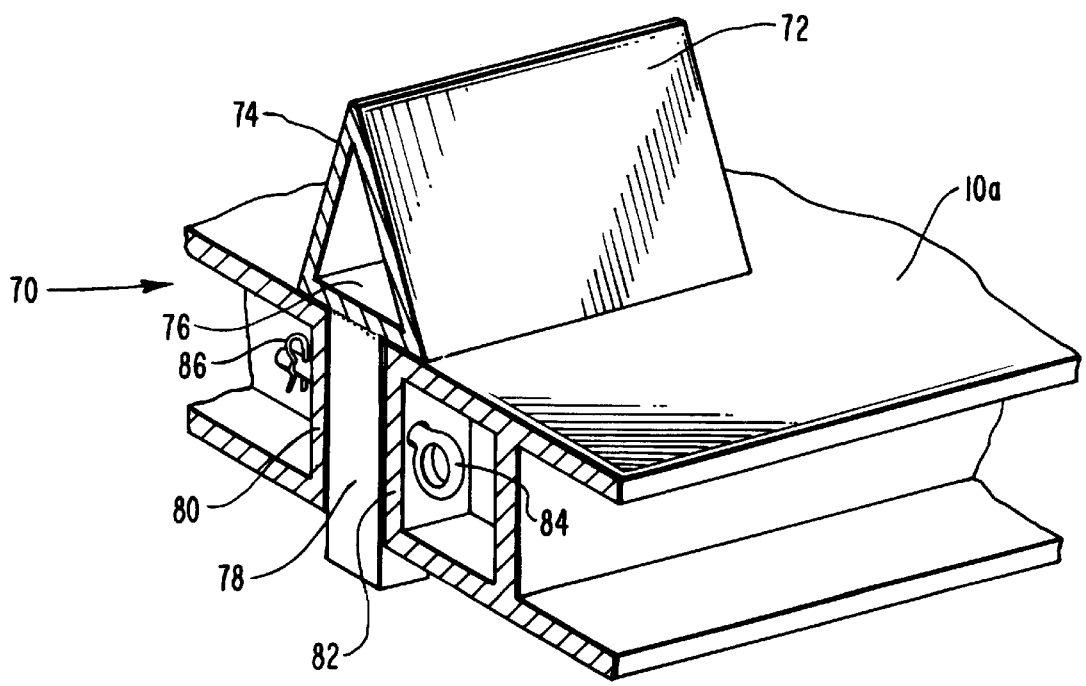
FIG. 8 is a cutaway view of a portion of a flatbed trailer showing a receiver slot therein, a tongue secured in the receiver slot, and an angulated surface of a vehicle loading device to which the tongue is connected.

FIG. 8 depicts yet another alternative embodiment of the vehicle loading device of the present invention. Shown therein is a removable system 70 comprising an angulated surface 72, a support member 74 attached to angulated surface 72, which, together with a base 76 forms a triangle. A tongue 78 attached to base 76 is adapted for engagement into a receiver slot defined by surfaces 80 and 82 as well as two other surfaces not depicted. A pin 84 allows tongue 78 to be removable fastened within the receiver slot, and a cotter pin 86 locks pin 84 in place.

In one embodiment, removable system 70 is situated on deck 10a in each location shown in FIG. 1 where an angulated surface 14 and support member 20 is located. Thus, flatbed trailer 10 and loading ramp 28 would be supplied with a receiver slot in deck 10a approximately under each location wherein is shown an angulated surface 14 and support member 20. Of course, removable systems 70 could be located at other positions on deck 10a, and multiple receiver slots could be supplied on deck 10a for each angulated surface 72. Multiple receiver slots allow the loading of different sized vehicles on a single flatbed trailer 10 or other vehicle transporting surface.

Of course, angulated surface 72 could also be permanently fastened to deck 10a, such as by welding or integral formation of deck 10a and angulated surface 72. Furthermore, angulated surface 72 could be longer than shown, including a length that traverses the full length of deck 10a and also the full length of loading ramp 28.

Figure 9:
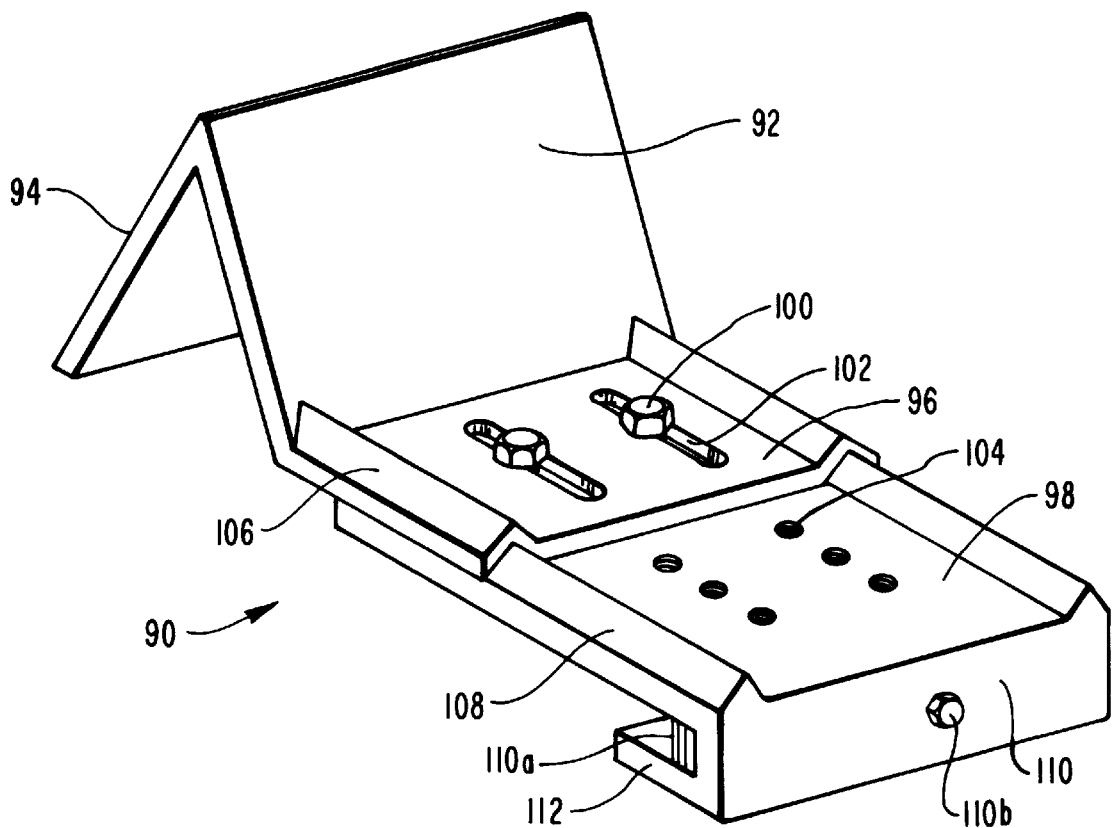
FIG. 9 is a perspective view of a vehicle loading device which is configured with an angulated surface, a brace opposite the angulated surface, and an adjustable distance between the angulated surface and the brace.

FIG. 9 depicts an alternate embodiment of a vehicle loading device comprising an adjustable vehicle loading device 90. Adjustable vehicle loading device 90 comprises an angulated surface 92 attached with a support member 94. Also attached to angulated surface 92 and extending therefrom at a nonorthogonal angle as described above is a first flat plate 96. First flat plate 96 adjustable interfaces with a second flat plate 98 by way of a pair of bolts 100 which extend through a pair of slots 102 in first flat plate 96 and a pair of holes 104 in second flat plate 98. Other sets of holes 104 are also provided for alternate adjustment positions. Grooved side sections 106 in first flat plate 96 rest on ridges 108 in second flat plate 98 to maintain alignment of first flat plate 96 with respect to second flat plate 98. Grooved side sections 106 and ridges 108 also serve as a means for preventing forward and rearward movement of the vehicle on the vehicle transporting surface and as such are an alternative to the use of laterally extending bars 22 of FIG. 1.

Adjustable vehicle loading device 90 also comprises a brace 110 and a lip 112 similar to bracing member 18 and lip 36 of FIG. 2. The manner of use of adjustable vehicle loading device 90 is consequently essentially similar to that of vehicle loading devices 12a–12f of FIG. 1. With adjustable vehicle loading device 90, however, the distance between angulated surface 92 and brace 110 is adjustable to accommodate vehicles of different widths.

Of course, other means for altering the distance between angulated surface 92 and brace 110 could also be used. For instance, one or more shims 110a could be fastened to the inside of brace 110 and could be used with or without lip 112. Thus, adding to shims 110a would move angulated surface 92 towards the edge of deck 10a, thereby accomodating wider vehicles. Deleting from shims 110a would move angulated surface 92 away from the edge of deck 10a, accomodating narrower vehicles. In the depicted embodiment, shims 110a are fastened to brace 110 with a bolt 110b.

Figure 10:
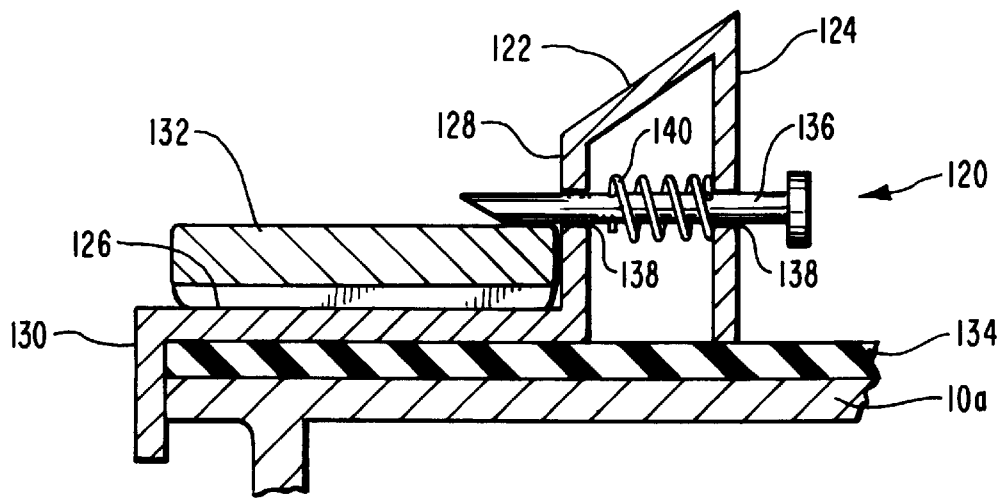
FIG. 10 is a cross-sectional view of a vehicle loading device provided with a vertically extending surface attached between an angulated surface and a flat plate. Also shown is a rubber mat situated between the flat plate and the deck of a flatbed trailer. A spring lever pin is also shown inserted through the vertically extending surface and over a bottom portion of a track of a truck-driven vehicle to secure the vehicle to the vehicle loading device.

FIG. 10 depicts yet another alternate embodiment of a vehicle loading device. Shown therein is a multiangled vehicle loading device 120. Multiangled vehicle loading device 120 comprises an angulated surface 122 which is attached to a support member 124. A flat plate 126 is also provided, but is connected to angulated surface 122 with a vertically extending plate 128. Vertically extending plate 128 extends upward from flat plate 126 at an orthogonal angle to flat plate 128. Angulated surface 122 extends from flat plate 126 toward the interior of deck 10a with an angle that is other than orthogonal to flat plate 126. A brace 130 is connected to the far edge of flat plate 126 for resting against the edge of deck 10a.

Multiangled vehicle loading device 120 is used essentially in the same manner as described above for the other embodiments. Multiangled vehicle loading device 120 also provides, however, added security in aligning the vehicle to flat plate 126 with the use of vertically extending plate 128 which the tracks or wheels of the vehicle, represented by a lower track portion 132. The combined height and shape of multiangled vehicle loading device 120 lessens the probability that a wheeled or track-driven vehicle will bounce or otherwise be caused to traverse thereover or out of alignment. Vertically extending plate 128 could be set at other angles relative to flat plate 126, and could also be located at the top of angulated surface 122.

A further optimal feature is depicted in FIG. 10 in the form of a rubber mat 134. Rubber mat 134 is placed under flat plate 126 to prevent slippage of flat plate 126 relative to deck 10a. Rubber mat 134 can also be used with the other embodiments described herein.

FIG. 10 also depicts yet another embodiment for securing a vehicle to flat plate 126. Shown therein is a pin 136 engaged through openings 138 in support member 124 and vertically extending plate 128. Pin 136 is placed at a strategic height that causes it, when inserted, to rest over lower track portion 132, thereby securing the track of the vehicle to flat plate 126. Pin 136 can be spring loaded with a spring 140, or can be otherwise inserted and secured in place. Of course, pin 136 could be inserted through angulated surface 122 rather than through vertically extending plate 128, if dimensioned appropriately.

In the depicted embodiments, the vehicle loading devices are formed of steel. Other materials, however, could also be used for greater strength, to save cost, or to lighten the vehicle loading devices. For instance, aluminum and titanium alloys could be used in the construction thereof. Honeycombed or other high strength, light materials could also be used.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for aligning a vehicle on a vehicle transporting surface comprising:
    a vehicle having left and right means for support separated by a distance;
    a vehicle transporting surface having left and right opposing sides, the vehicle being supported by the vehicle transporting surface;
    a left and a right angulated surface extending upward from the vehicle transporting surface at an angle other than orthogonal to the vehicle transporting surface, a bottom of the left angulated surface being separated from a bottom of the right angulated surface by a distance that is approximately equal to the distance between the left and the right means for support;
    the left angulated surface having:
        left flat surface extending horizontally from the left angulated surface for resting flush on the vehicle transporting surface while allowing the left angulated surface to extend from the vehicle transporting surface at an angle other than orthogonal to the vehicle transporting surface;
        left bracing member extending downward from the left flat surface at an edge thereof opposite the left angulated surface;
    the right angulated surface having:
        right flat surface extending horizontally from the right angulated surface for resting flush on the vehicle transporting surface while allowing the right angulated surface to extend from the vehicle transporting surface at an angle other than orthogonal to the vehicle transporting surface;
        right bracing member extending downward from the right flat surface at an edge thereof opposite the right angulated surface;
    wherein the left angulated surface forcing the vehicle towards the left side of the vehicle transporting surface when the left means for support is in contact therewith, and the right angulated surface forcing the vehicle towards the right side of the vehicle transporting surface when the right means for support is in contact therewith.

2. The system as defined in claim 1, wherein the left and right means for support are each an endless track for driving the vehicle.

3. The system as defined in claim 1, wherein the left and right means for support are each a wheel for driving the vehicle.

4. A system as recited in claim 1, wherein the left and right angulated surfaces together with the left and right surfaces and the left and right bracing members maintain a continuous alignment of the vehicle in a selected alignment position on the vehicle transporting surface during transportation of the vehicle.

5. A system as recited in claim 1, wherein the left and right surfaces and the left and right bracing members orient the left and the right angulated surfaces with an angle from the vehicle transporting surface in a range from about 30 to about 80 degrees.

6. A system as recited in claim 1, wherein the left and right surfaces and the left and right bracing members orient the left and the right angulated surfaces with an angle from the vehicle transporting surface of about 45 degrees.

7. A system as recited in claim 1, further comprising means for preventing forward and rearward motion of the vehicle.

8. A system as recited in claim 1, further comprising:
    left and right support members extending downward from the tops of the left and right angulated surfaces respectively to brace against the vehicle transporting surface.

9. A system as recited in claim 1, wherein the left and right means for support comprise a left and a right endless track respectively, and wherein the left angulated surface is conformed so as to be situated adjacent the interior edge of the left endless track and the right angulated surface is conformed so as to be situated adjacent the interior edge of the right endless track, such that the left and right angulated surfaces exert opposing forces on the vehicle.

10. A system as recited in claim 1, further comprising:
    a second left and a second right angulated surface extending upward from the vehicle transporting surface at an angle other than orthogonal to the vehicle transporting surface, the second left angulated surface being separated from the second right angulated surface by a distance not less than the distance between the left and the right means for support, the second left and second right angulated surfaces having means for removably attaching respectively to the left and right sides of the vehicle transporting surface, the second left angulated surface forcing the vehicle towards the left side of the vehicle transporting surface when the left means for support is in contact therewith, and the second right angulated surface forcing the vehicle towards the right side of the vehicle transporting surface when the right means for support is in contact therewith, and wherein the second left angulated surface is located on the same side of the vehicle transporting surface as the left angulated surface and wherein the second right angulated surface is located on the same side of the vehicle transporting surface as the right angulated surface.

11. The system as defined in claim 1, wherein the left and right angulated surfaces are separated by a distance that is less than the distance between the left and right opposing sides of the vehicle transporting surface.

12. A device for aligning a vehicle having left and right means for support separated by a distance on a vehicle transporting surface having left and right opposing sides, the device comprising:

a left and a right angulated surface extending upward from the vehicle transporting surface at an angle other than orthogonal to the vehicle transporting surface, a bottom of the left angulated surface being separated from a bottom of the right angulated surface by a distance that is approximately equal to the distance between the left and the right means for support, the left and right angulated surfaces having means for removably attaching respectively to the left and right sides of the vehicle transporting surface and comprising left and right flat surfaces, each of the left and right flat surfaces extending horizontally respectively from the left and the right angulated surfaces for resting flush on the vehicle transporting surface while allowing the left and right angulated surfaces to extend from the vehicle transporting surface at an angle other than orthogonal to the vehicle transporting surface, the left angulated surface forcing the vehicle towards the left side of the vehicle transporting surface when the left means for support is in contact therewith, and the right angulated surface forcing the vehicle towards the right side of the vehicle transporting surface when the right means for support is in contact therewith;

means for preventing forward and rearward motion comprising:
left and right upwardly protruding members situated respectively on one of the left and the right flat surfaces and extending upward therefrom for respectively engaging the left and right support means.

13. System for aligning a vehicle on a vehicle transporting surface comprising:

a vehicle having left and right means for support separated by a distance;

a vehicle transporting surface having left and right opposing sides and supporting said vehicle a left and a right angulated surface extending upward from the vehicle transporting surface at an angle other than orthogonal to the vehicle transporting surface, a bottom of the left angulated surface being separated from a bottom of the right angulated surface by a distance that is approximately equal to the distance between the left and the right means for support, the left and right angulated surfaces having means for removably attaching respectively to the left and right sides of the vehicle transporting surface, the left angulated surface forcing the vehicle towards the left side of the vehicle transporting surface when the left means for support is in contact therewith, and the right angulated surface forcing the vehicle towards the right side of the vehicle transporting surface when the right means for support is in contact therewith;

left and right flat surfaces, each of the left and right flat surfaces extending horizontally respectively from the left and the right angulated surfaces for resting flush on the vehicle transporting surface while allowing the left and right angulated surfaces to extend from the vehicle transporting surface at an angle other than orthogonal to the vehicle transporting surface; and left and right bracing members extending downward respectively from the left and right flat surfaces at an edge thereof opposite the respective left and right angulated surface.

14. A system as recited in claim 13, wherein the distance is adjustable between at least one of the left angulated surface and the left bracing member, and the right angulated surface and the right bracing member.

15. A system as recited in claim 13, further comprising a left and a right lip extending laterally inward respectively from a left and a right bottom edge of the left and right bracing members toward the left and the right angulated surfaces, the left and the right lips each being configured to wrap around an edge of the vehicle transporting surface in order to retain the respective left and right flat surfaces to the vehicle transporting surface.

16. A system as recited in claim 13, further comprising left and right vertical surfaces respectively connected to the left and right angulated surfaces so as to extend respectively between the left and right angulated surfaces and the vehicle transporting surface.

17. A system as defined in claim 13, wherein the left and right means for support are each a wheel for driving the vehicle, and further comprising:

a second left and a second right angulated surface extending upward from the vehicle transporting surface at an angle other than orthogonal to the vehicle transporting surface, the second left angulated surface being separated from the second right angulated surface by a distance not less than the distance between the left and the right wheels, the second left and second right angulated surfaces having means for removably attaching respectively to the left and right sides of the vehicle transporting surface, the second left angulated surface forcing the vehicle towards the left side of the vehicle transporting surface when the left means for support is in contact therewith, and the second right angulated surface forcing the vehicle towards the right side of the vehicle transporting surface when the right means for support is in contact therewith, and wherein the second left angulated surface is located on the same side of the vehicle transporting surface as the left angulated surface and wherein the second right angulated surface is located on the same side of the vehicle transporting surface as the right angulated surface;

a left elongated member extending between the left and second left angulated surfaces; and a right elongated member extending between the right and second right angulated surfaces.

18. A device for aligning a vehicle having left and right endless tracks separated by a distance on a vehicle transporting surface having left and right opposing sides, the device comprising:

a left and a right angulated surface extending upward from the vehicle transporting surface at an angle other than orthogonal to the vehicle transporting surface, a bottom of the left angulated surface being separated from a bottom of the right angulated surface by a distance that is approximately equal to the distance between the left and the right endless tracks, the left and right angulated surfaces having means for removably attaching respectively to the left and right sides of the vehicle transporting surface, the left angulated surface forcing the vehicle towards the right side of the vehicle transporting surface when the left endless track is in contact therewith, and the right angulated surface forcing the vehicle towards the left side of the vehicle transporting surface when the right endless track is in contact therewith;

left and right flat surfaces, each of the left and right flat surfaces extending horizontally respectively from the left and the right angulated surfaces for resting flush on the vehicle transporting surface while allowing the left and right angulated surfaces to extend from the vehicle transporting surface at an angle in a range from about 30 to about 80 degrees;

left and right bracing members extending downward respectively from the left and right flat surfaces at an edge thereof opposite the respective left and right angulated surface for contacting the left and right sides respectively of the vehicle transporting surface;

left and right support members extending downward from the tops of the left and right angulated surfaces respectively to brace against the vehicle transporting surface; and left and right upwardly protruding members situated respectively on one of the left and the right flat surfaces and extending orthogonally thereto for respectively engaging the left and right endless tracks.

\* \* \* \* \*